United States Patent [19]

Mair

[11] 4,293,515
[45] Oct. 6, 1981

[54] MANUFACTURE OF PLASTICS PRODUCTS

[75] Inventor: William J. Mair, Merrow, near Guildford, England

[73] Assignee: Plastic Recycling Limited, England

[21] Appl. No.: 73,615

[22] Filed: Sep. 10, 1979

[30] Foreign Application Priority Data

May 11, 1979 [GB] United Kingdom ............... 16510/79

[51] Int. Cl.³ ............................................... B27J 5/00
[52] U.S. Cl. ...................................... 264/120; 264/126
[58] Field of Search .................................. 264/120, 126

[56] References Cited

U.S. PATENT DOCUMENTS

| | | | |
|---|---|---|---|
| 3,874,962 | 4/1975 | Gersbeck et al. | 264/109 |
| 4,005,162 | 1/1977 | Bucking | 264/122 |
| 4,097,640 | 6/1978 | Curry et al. | 264/120 |

Primary Examiner—James R. Hall
Attorney, Agent, or Firm—Wigman & Cohen

[57] ABSTRACT

Manufacturing plastics products from a raw material containing at least 50% by weight reclaimed synthetic thermoplastics material by conveying a mat of the raw material through an oven to heat the material to the softening point thereof, and compressing the softened mat downstream of the oven between three rollers arranged generally one above the other to define a first nip between the upper and middle lower rollers and a second nip or passage between the middle and lower rollers, wherein the middle and lower rollers are of substantially greater diameter than the upper roller.

5 Claims, 1 Drawing Figure

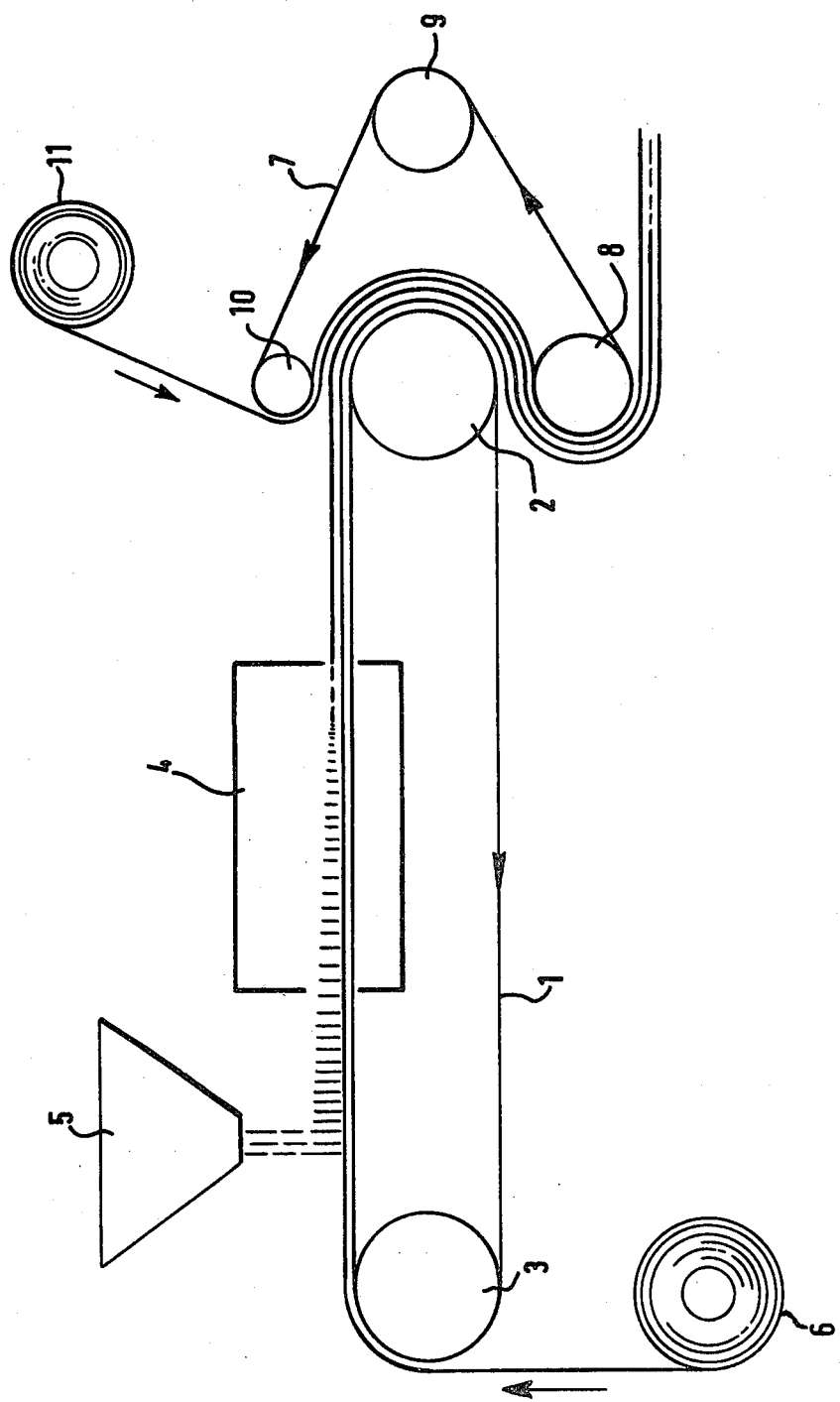

MANUFACTURE OF PLASTICS PRODUCTS

This invention relates to the manufacture of plastics products, in particular to the manufacture of board-like articles from scrap or salvaged plastics materials.

Our British Pat. Nos. 1,267,917, 1,267,918, 1,369,204 and 1,439,353 essentially relate to the manufacture of plastics products, particularly board-like articles, from a raw material containing at least 50% by weight reclaimed synthetic thermoplastics material by providing a mat of the raw material in particulate or granulated form, heating the mat to the softening point of the material by conveying the mat of material through an oven, and compressing the softened mat to a required shape.

The present invention is concerned with an improvement in or modification of such a method.

Accordingly, the present invention in one aspect provides a method of manufacturing plastics products, particularly board-like articles, from a raw material containing at least 50% by weight reclaimed synthetic thermoplastics material by providing a mat of the raw material in particulate or granulated form, heating the mat to the softening point of the material by conveying the mat of material through an oven, and compressing the softened mat downstream of the oven between three rollers arranged generally one above the other to define a first nip or passage between the upper and middle rollers and a second nip or passage between the middle and lower rollers, the mat passing from the oven through the said first nip, around the middle roller to the said second nip, and then around the lower roller to continue in the direction away from the oven, wherein the middle and lower rollers are of substantially greater diameter than the upper roller.

The invention in another aspect provides apparatus for carrying out the method according to the invention, comprising a conveyor, means for feeding a mat of the raw material onto the conveyor at an upstream portion thereof, an oven downstream of the raw material feeding means for heating the mat to the softening point of the material, and an arrangement of three rollers downstream of the oven for compressing the softened mat, the three rollers being arranged generally one above the other to define a first nip between the upper and middle rollers and a second nip between the middle and lower rollers, wherein the middle and lower rollers are of substantially greater diameter than the upper roller.

The middle and lower rollers may be of the same diameter, or one of the middle and lower rollers may be of greater diameter than the other. In any case both the middle and lower rollers preferably have a diameter at least twice that of the upper roller. For example, if the diameter of the upper roller is 1 ft. then the diameters of the middle and lower rollers may be suitably both 2 ft. 6 ins, or the middle roller may suitably have a diameter of 3 ft. and the lower roller a diameter of 2 ft, or the middle roller may suitably have a diameter of 2 ft. and the lower roller a diameter of 3 ft.

Such an arrangement wherein the middle and lower rollers have a greater diameter than the upper roller leads to reduced cracking of the mat and also increased throughput of the mat through the apparatus, and also allows more efficient cooling of the mat as it passes around the rollers.

If the middle and lower rollers have a diameter less than twice that of the upper roller then the mat is more inclined to crack as it passes around the rollers. If, on the other hand, the middle and lower rollers are made bigger than exemplified above in relation to the upper roller, then the apparatus will become too high.

The three rollers are preferably arranged vertically one above the other, but they may be offset; for example the middle roller could be offset from the upper and lower rollers in the direction away from the oven, the upper roller being vertically arranged above the lower roller.

The mat is preferably subjected to cooling as it passes around the rollers, for example by internally cooling the rollers themselves and/or spraying a mist of coolant where the mat passes around and between the rollers. Preferably the coolant is only applied to the middle and lower rollers. A mist of coolant is preferably applied to the mat as it emerges from the second nip between the middle and lower rollers, if this method of cooling is employed.

The particulate or granulated material preferably passes through and emerges from the oven on a sheet of for example polyethylene and another sheet of polyethylene is applied to the other face of the mat of material while compressing the latter. The second sheet of polyethylene to be applied is fed into the first nip between the upper and middle rollers together with the mat of material which already has a similar sheet applied thereto. Following the compression between the rollers there is produced a mat of material sandwiched between two sheets of polyethylene. However, polyethylene need not be fed into the nip between the upper and middle rollers, ie. the mat may have a sheet of polyethylene applied to one face only thereof.

The raw material used to provide the mat may suitably include particles of fibrous material in the form of any one or more of paper, paperboard, cardboard, sawdust, wood chips and straw; metal foil; faced paper, paperboard and cardboard; bitumastic paper, paperboard and cardboard; and plastics coated paper, paperboard and cardboard. The raw material may be salvaged material and comprise a random mixture of different thermoplastics materials or may be scrap from other manufacturing processes. Thus the raw material may suitably comprise one or more of polyolefines, vinyl resins, polyamides and acrylic resins, eg. polyethylene, polypropylene, polystyrene, polyvinyl chloride, polyvinyl acetate, nylon or polymethyl methacrylate.

The compression step is suitably carried out at a pressure between 10 and 1000 lbs/square inch, and the residence time for the compression step is preferably between 10 seconds and 1 or 2 minutes. The residence time for the heating of the mat is preferably between 2 and 20 minutes and the mat of raw material is of course heated to at least the softening point of the highest melting thermoplastics constituent. The actual conditions will, however, vary with the nature of the raw material used.

The finished mat preferably has a thickness in the range of 3 to 25 mm, and may be suitably produced in thicknesses of 6, 9, 12 and 15 mm.

The invention will be further described, by way of example only, with reference to the accompanying drawing, which is a schematic side view illustrating apparatus for carrying out the method according to the invention.

Referring to the drawing, a continuous conveyor belt 1 made of resin bound glass fibre material coated with polytetrafluoroethylene is driven around rollers 2 and 3 in the direction indicated by the arrow, the upper run of the belt passing through an oven 4. Upstream of the oven 4 is a hopper 5 from which particulate or granulated raw material containing at least 50% by weight, preferably about or above 85% by weight, reclaimed synthetic thermoplastics material may be deposited on the upper run of the belt 1. Reference numeral 6 indicates a roll of polyethylene which may be fed in the direction indicated by the arrow around the roller 3 onto the conveyor belt 1 at a point upstream of the hopper 5.

A second continuous conveyor belt 7 is drawn around rollers 8, 9 and 10 and in contact with the roller 2 in the direction indicated by the arrows. Reference numeral 11 indicates a further roll of polyethylene which may be fed in the direction indicated by the arrow around the roller 10.

The rollers 2 and 8 may be internally cooled and/or a mist of coolant may be sprayed onto the mat emerging from between the rollers 2 and 8. If the rollers 2 and 8 are internally cooled the coolant may be suitably recirculated through a conventional recirculation plant.

It will be seen that the rollers 10, 2 and 8 are arranged vertically one above the other to define a first nip between the rollers 10 and 2 and a second nip between the rollers 2 and 8. The diameters of the rollers 10, 2 and 8 are in approximate ratio 1:3:2.

In use, a polyethylene sheet is fed from the roll 6 onto the conveyor belt 1 and particulate or granulated raw material is fed from the hopper 5 onto the polyethylene sheet and is smoothed to form a layer about 30 mm thick. On passing through the oven 4 the mat of material on the polyethylene sheet is heated to the softening point of the highest melting thermoplastics constituent of the material, whereupon the thermoplastics material in the mat is caused to melt and flow between and bind the pieces of other material in the mat.

On emerging from the oven 4 the mat of material, which is now about 15 mm thick, is passed into the nip between the rollers 10 and 2, and around the roller 2 into the nip between the rollers 2 and 8 where the mat is compressed to a thickness of for example about 12 mm. It is, however, envisaged that the apparatus may be utilized to produce material of various thicknesses, preferably in the range from 3 to 25 mm. Simultaneously a further polyethylene sheet is fed from the roll 11 into the nip between the rollers 10 and 2 and is bonded by compression onto that side of the mat opposite the side to which a polyethylene sheet originating from the roll 6 has already been applied. The mat then passes around the roller 8 and continues as shown in the direction away from the oven 4 for cutting into sheets and possible further treatment.

More than one film of polyethylene may be applied at one or both ends of the conveyor from separate rolls. For example, there may be two rolls 11 each feeding a polyethylene sheet into the nip between the rollers 10 and 2, one of these sheets of polyethylene extending over the full width of the mat and the other polyethylene sheet being a relatively narrow strip which may for example carry some distinctive marking.

The upper roller 10 might possibly be heated to assist bonding of the polyethylene sheet(s) to the mat.

In FIG. 1, the roller 10 has a diameter of about 1 ft, the roller 2 has a diameter of about 3 ft and the roller 8 has a diameter of about 2 ft. However, the sizes of the rollers 2 and 8 could be reversed or the rollers 2 and 8 could both have a diameter of about 2 ft 6 ins.

The method is preferably operated continuously, and the raw material preferably contains at least 85% by by weight reclaimed synthetic thermoplastics material.

The product obtained by the method according to the invention may for example find use in agricultural applications, because it is pliable, non-moisture absorbing and is not attacked by animals, or may find use as a cable covering, but many other uses are envisaged.

I claim:

1. A method of manufacturing a plastics product from a raw material containing at least 50% by weight reclaimed synthetic thermoplastics material, comprising the steps of:

forming a mat of the raw material in particulate form on a conveyor belt;

heating the mat of material by conveying the mat through an oven on the conveyor belt to cause the thermoplastics material in the mat to soften; and compressing the softened mat downstream of the oven between said conveyor belt and a further belt passing around three rollers arranged generally one above the other to define a first passage between the upper and middle rollers and a second passage between the middle and lower rollers, the mat passing from the oven through said first passage, around the middle roller to said second passage, and then around the lower roller to continue in the direction away from the oven, the middle and lower rollers being of substantially greater diameter than the upper roller, while cooling the mat at least as it passes around said middle roller, whereby the softened thermoplastics material binds the pieces of other material in the mat to thus produce a unitary, continuous, indefinite length sheet.

2. The method according to claim 1, wherein said middle roller is of greater diameter than said lower roller.

3. The method according to claim 1, wherein both said middle and lower rollers have a diameter at least twice that of said upper roller.

4. The method according to claim 1, wherein the ratio of the diameters of said upper, middle and lower rollers is substantially 1:3:2 respectively.

5. The method according to claim 1, further comprising cooling the mat as it passes around at least said middle and lower rollers.

* * * * *